March 6, 1962 W. W. SALISBURY 3,024,394

LOW INDUCTANCE CONDENSER

Filed Jan. 27, 1958 2 Sheets-Sheet 1

Inventor
Winfield W. Salisbury
By Francis W. Crotty
Attorney

Inventor
Winfield W. Salisbury
By Francis W. Crotty
Attorney 3,024,394

LOW INDUCTANCE CONDENSER

Winfield W. Salisbury, Palo Alto, Calif., assignor to Zenith Radio Corporation, a corporation of Delaware Filed Jan. 27, 1958, Ser. No. 711,376
11 Claims. (Cl. 317—261)

This invention relates to condensers having an extraordinarily low internal inductance. Such condensers have general application to electrical systems wherein fast time constants are required, that is, systems in which it is necessary to deliver high peak currents for very brief intervals of time. One familiar example is photoflash apparatus employing gaseous discharge tubes. Another important but less familiar field of application of the invention is the field of controlled thermonuclear reaction.

It has been proposed that a controlled thermonuclear reaction may be attained by employing an exceedingly concentrated magnetic field fashioned to enclose a reaction space within which is contained a plasma of a suitable reactant. In pursuing this approach to controlled thermonuclear reaction, it is necesasry to construct circuitry capable of supplying enormous quantities of energy for short pulse intervals in the order of 50 microseconds or less. Manifestly, specifications of this type can be met only through the use of "fast circuits" and the energy, which is usually derived from condenser banks, will have the steep wave form or fast rise time required only if the inherent inductance of the power supply—including the condensers—is reduced to a minimum. Since techniques have been developed for minimizing lead inductance and the like, a limitation on the speed or rise time of the circuitry may be imposed by the condenser units themselves. Experience has shown that condensers of ordinary construction are incapable of use in such circuits unless the expedient of reducing their effective inductance, through the device of parallel arrangements of condenser units, is employed to an unnecessarily costly and complicated degree. And even this possibility suffers from the limitation that some increment of inductance is contributed by the leads and conductors employed in effecting the interconnection of condenser units. In other words, condensers of conventional construction are inherently high-inductance devices and when viewed in the light of the circuit specifications under consideration, are not suitable for use therein.

The high inductance of the ordinary condenser follows directly from structure itself, that is, the structure inherently has a substantial inductance. Usually, it comprises a sandwich of aluminum foils and an interposed sheet insulation of paper or the like, all of appropriate surface area rolled or wound together. Each foil usually protrudes beyond the insulator in the width direction and its coil turns are conductively connected together at one end by soldering or otherwise and a lead is connected to each such foil to serve as a terminal strip. The terminal strip has no appreciable inductance at low or ordinary operating frequency such as 60 cycles, and the condenser is perfectly adequate for use in such power circuits but if included in the fast circuits characteristic of controlled thermonuclear-reaction apparatus, the leads represent a major inductance component and prevent attainment of the desired speed or rise time.

One previous effort to reduce the lead inductance contemplated enclosing the capacitor unit within a conductive container and conductively connecting the lowermost foil thereto, taking advantage of the lower inductance represented by the large surface of the container. This is partially effective but fails to achieve the maximum reduction in inductance for the simple reason that there is an appreciable volume represented by the spacing of the capacitor from the container walls. The discharge current of the condenser is thus able to produce a flux or magnetic field in this space which is merely a manifestation of inductance.

Moreover, it is conventional practice in the fabrication of such condensers to compute the thickness of insulation required between the foils in view of the voltage rating of the condenser and to realize this thickness by layers or laminations of thin paper or other dielectric. It is recognized that the laminations may contain metal inclusions and may have pin holes; they are almost unavoidable in the making of such laminations. To allow for this possible deficiency of the dielectric, it is customary to add at least one more lamination than the number computed in relation to the voltage rating alone. As a consequence, the condenser structure has more volume than required and the apparent inductance always increases with volume.

Accordingly, it is an object of this invention to provide a condenser which presents less internal inductance than the aforementioned condensers of the prior art.

It is a further object of the invention to provide an improved condenser having a low inductance and thus suitable for use in fast circuits, e.g. circuits of very short time constant.

Another object of the invention is to provide a capacitor unit which, per se, has a low inductance and which lends itself to arrangement with units of like construction, together to constitute a condenser of desired capacity and voltage rating and of low internal inductance.

A low inductance condenser, in accordance with the subject invention, comprises a first plurality of essentially planar conductive elements of approximately equal width arranged in juxtaposed parallel relation and conductively connected together along corresponding end sections of each to constitute an electrode structure having a thickness small with respect to its width. A second and like plurality of planar conductive elements of substantially the same dimensions as, and disposed and connected to one another in the same manner as, the first-mentioned elements constitutes a second electrode structure which is disposed in interlaced relation with the first structure. Insulating material is interposed between adjacent conductive elements of the interlaced structures. The condenser has a pair of space-opposed terminal strips individually having a width approximately equal to that of the conductive elements. One strip is conductively connected to the aforesaid end sections of one of the electrode structures and extends in a certain direction from the condenser. There are means including at least one conductor having the same width as the terminal strips and connected to the other of the terminal strips as an extension thereof. This last mentioned conductor is also coupled to the other electrode structure and extends in parallel relation to but with minimum separation from the interlaced structure to present with the aforesaid one terminal strip the condition of image currents in close physical proximity.

The foregoing and other objects of the invention, together with further advantages and benefits thereof, will be more clearly understood from the following description of particular embodiments thereof taken in conjunction with the annexed drawings in the several figures of which like components are designated by similar reference characters and in which.

Figures 1, 2:
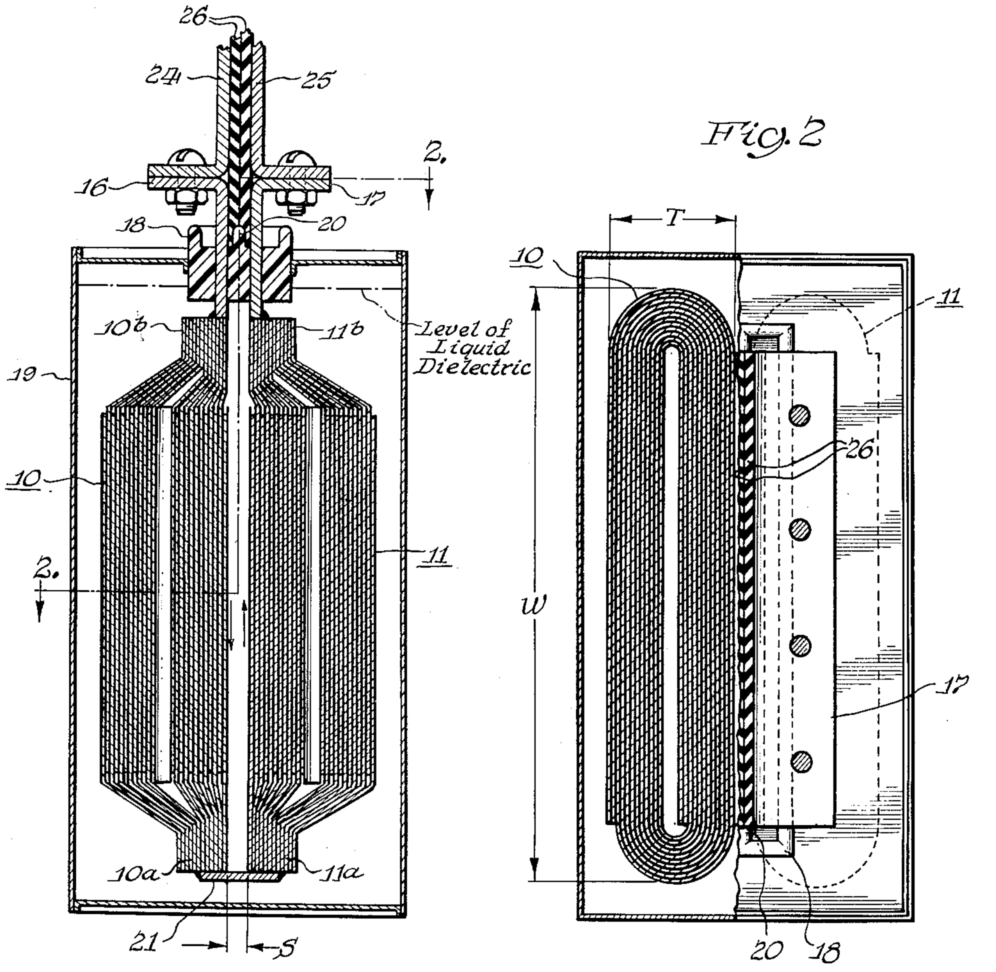
FIGURE 1 is a vertical sectional view of a condenser constructed in accordance with the invention and including two capacitor units.
FIGURE 2 is a view, partially broken away, of the structure of FIGURE 1 taken as indicated by section line 2—2.
Figure 3:
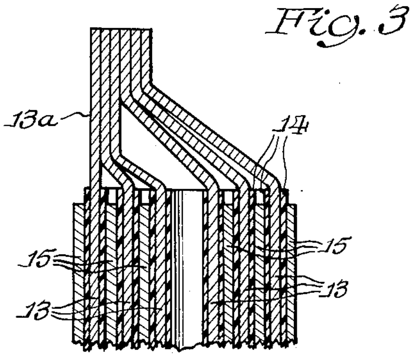
FIGURE 3 is a detailed sectional view of a portion of the condenser of FIGURE 1.

Referring now more particularly to FIGS. 1–3, inclusive, the condenser herein represented is characterized by a low internal inductance, low in comparison with the inductance of prior art structures. This improved inductance property is achieved, as will be more clearly developed in the ensuing description, by reducing to a minimum the space or volume in which a magnetic field can be created as an incident to the discharge current of the condenser. Expressed in other words, the arrangement assures that every current within the structure sees, in close physical proximity, an equal and opposite current.

The condenser of FIGS. 1–3 includes two capacitor units 10 and 11 of identical construction connected in series. In certain respects, the fabrication of each such unit has some common ground with prior condensers. In particular, the construction of each unit commences by winding a pair of conductive foils with interposed sheets of dielectric material on a mandrel. The foil is made of aluminum or copper and the insulation is paper, "Mylar," a plastic or any standard dielectric material. After forming by winding on the mandrel, the foil-insulation structure is deformed in a press so as to flatten it out, changing the circular cross section of the wound structure into a generally elliptical or flat circular cross section, indicated by the plan view of unit 10 in FIG. 2. If W designates the width of the structure, and T its thickness, it is apparent that the width is very much greater than the thickness. Preferably the ratio of W to T is made as large as possible consistent with the strength of the conductive foils which tend to rupture at the loop sections 12 if the structure is crushed beyond the foil strength.

Referring now to the detail of FIGURE 3, it is clear that alternate foil sections 13 extend or project beyond the insulation 14. This circumstance results from having the foil comprising sections 13, 13 extend over the insulation as they are fed to the winding mandrel. This is conventional practice and is, of course, also true of the other foil, namely, that comprised of the foil sections 15, 15 which alternate with sections 13, 13. It is convenient to view sections 13, 13 of the first foil as a plurality of conductive elements which, neglecting the small loop sections at the ends of the ellipse, are essentially planar conductive elements; planar since the winding has been flattened. These elements, again neglecting the small end portions, are of approximately equal width W and are arranged in juxtaposed parallel relation.

They are conductively connected together along corresponding end sections of each to constitute a single, multiplate electrode structure having a thickness T small relation to the width W. The manner of effecting end connections of these plates is illustrated in FIGURE 3. The parts of each of plates 13, 13 projecting beyond insulation 14 are pressed or swaged together and thus established in electrical contact. In preparing the capacitor unit with a view of completing a multi-unit condenser, it is desirable to swage them into a stack which, at one side, is in alignment with an end one of the plates 13, 13. The desideratum in the step of swaging is to reduce to a minimum the enclosed air space in order further to reduce the inductance.

Figure 4:
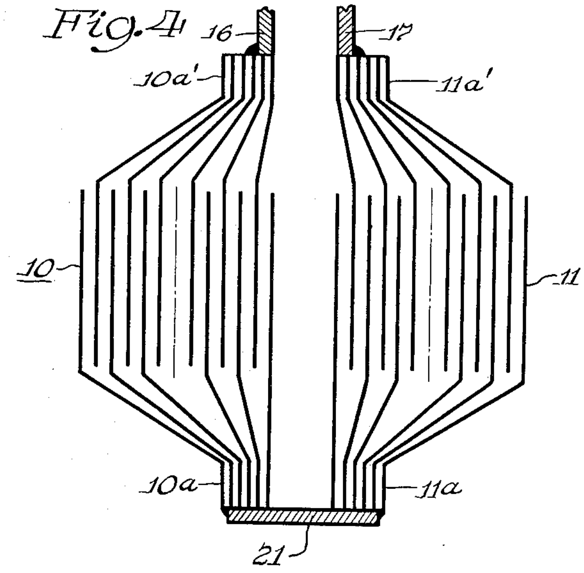
FIGURE 4 is a schematic representation of the condenser used for explanatory purpose.

In similar fashion, foil sections 15, 15 comprise a plurality of planar conductive elements or plates of substantially the same dimensions as, and disposed and connected to one another in the same manner as, plates 13, 13 to constitute a second multiplate electrode structure. While the parallel orientation of plates 15, 15 is clearly depicted in FIGURE 3, the conductive connection at the ends of these plates does not appear in the figure but is represented in the schematic showing of FIGURE 4. It will be understood to be the same as that described in respect of plates 13, 13. While structural features are illustrated in the figures, some simplification has been resorted to because of space limitations. In particular, it has not been expedient to show every turn that would be included in the wound foil-insulator structure. A lesser number of turns have been shown.

Since the capacitor unit is formed by an initial winding operation, the electrode structure having plates 13, 13 is obviously interlaced with that composed of plates 15, 15. Moreover, insulator 14 is interposed between adjacent plates of the interlaced structure. To achieve minimum inductance, the thickness of insulator 14 is made a minimum in relation to the voltage rating of the unit. In other words, the thickness corresponds to the computed value and the practice alluded herein above of adding at least one additional lamination of insulating material is preferably not followed.

Referring again to FIGURES 1 and 2, it will be understood that unit 10 as well as unit 11 is a capacitor of a particular preselected capacitance constructed as just described, of two interlaced electrode structures with their plates mutually insulated. These units are disposed in parallel relation to one another, specifically, they are positioned and supported in mirror image relation. The plates of units 10 and 11 which are closest to one another are those against which the companion plates are swaged. This is indicated for simplicity in the explanatory view of FIGURE 4 wherein it is observed that plates 10*a*, 10*a'* and 11*a*, 11*a'*, each of which has a direct correspondence to plate 13*a* of FIGURE 3, face one another. Since each electrode structure is formed by means of a winding operation, the two extreme or outermost plates of each are of one foil and the two innermost plates are of the other foil. The innermost plates are those immediately adjacent the center of the interlaced structure which center has been indicated by a dash-dot construction line. Further, units 10 and 11 are so positioned that the plates united at connections 10*a* and 11*a* include both extreme or end plates of these units, respectively. Similarly, the plates united at connections 10*a'* and 11*a'* include the penultimate plates of such units. Of course, this relation follows from forming the electrode structures from windings of foil and insulation.

The capacitor units are maintained in this relation by terminal strips, received in an insulation bushing which is mounted in an end wall of a container. The terminal strips are designated 16, 17 in FIGURES 1 and 2 and have essentially the same width as the width W of the electrode plates. It is convenient to form them from sheet stock of copper. The strips are connected as by soldering, and preferably throughout their entire width, to corresponding end sections of units 10 and 11 to extend in parallel and in the same direction therefrom as shown in FIGURE 1. They extend through a pair of parallel slots provided in a feed-through insulator 18 supported in an end wall of a metallic container 19. The insulator has a centrally located partition 20 which, in conjunction with the terminal strips, defines recesses to receive insulation strips of other circuit connectors presently to be described. The insulator 18 has sufficient depth to extend below the level of the liquid dielectric, such as oil, usually placed within the housing.

For the structure under consideration the two capacitor units are intended to be connected in series and this is accomplished by another connector strip 21. It has the same width as terminal strips 16, 17 and is electrically connected, by soldering, along its entire width to end sections 10*a* and 11*a*. This completes a series circuit from terminal strip 16, through unit 10, terminal connector 21, through unit 11 to terminal strip 17.

By appropriate proportioning of the electrode areas and dielectric properties, the capacitance of units 10 and 11 may be predetermined to desired values. Condensers rated at 3.0 microfarads and 4 kilovolts have been constructed and found to have an inductance of $166.6 \times 10^{-9}$ henry. Connections may be made to the condenser as indicated in FIGURE 1 by additional strip connectors 24, 25 having the same width as terminal strips 16, 17 and being connected thereto. Usually, like strips 26, 26 of insulating material are interposed between connectors 24, 25 and are received in the recesses formed by partition 20 and strips 16, 17. When energy is drawn from the condenser, the discharge current path is, as represented by the arrows in FIGURE 1, through units 10 and 11 in series. By virtue of the connection 21 the contiguous portions of these units are at the same potential so that the spacing between them may be very small, it need only be sufficient to accommodate the current transient during discharge. Accordingly, each current component sees its image in very close physical proximity and the inductance is, therefore, minimized, Actually, it is not necessary to interpose laminations of insulation between capacitor units 10 and 11; none has been shown in the drawing. This is a further distinct departure from prior practice and contributes significantly to lowering the inductance of the structure.

In certain circuit applications it may be necessary to achieve a higher voltage than can conveniently be obtained in the two unit condenser of FIGURES 1–3. This may be accomplished through an arrangement of the type represented in FIGURE 5 while still retaining the desired low-inductance properties. Any number of capacitor units, individually constructed as previously described, may be arranged in two vertical stacks. For purposes of explanation, four have been shown and designated 30, 31, 32, 33. The pair 30, 32 connect with terminal strips 16, 17 and are arranged with respect to one another as units 10 and 11 in the first embodiment. Likewise, the pair 31 and 33 have the same relative arrangement and connector strips 34, 35 and 36 complete a series circuit from the terminal strips through all the units.

Figure 5:
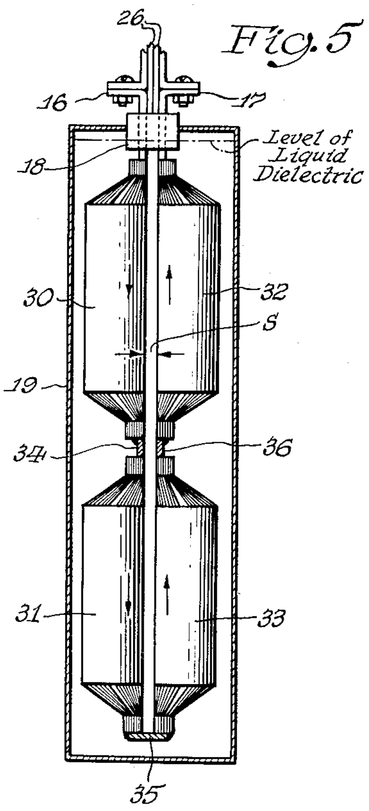
FIGURES 5 and 6 represent schematically four-unit condensers employing the invention.
Figure 6:
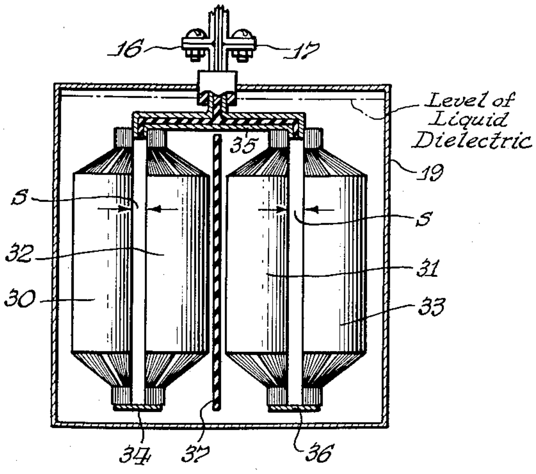

Alternatively, the four capacitor units may be arranged in the manner of FIGURE 6. Here, the unit pairs 30, 32 and 31, 33 are in horizontal rather than vertical alignment which necessitates a rearrangement of connector strips 34, 35 and 36 and terminal strips 16, 17. Further, insulation 37 is interposed between unit pairs and in the space between parallel segments of the connectors at the top of container. The same considerations of (*a*) minimum spacings between capacitor units; (*b*) minimum insulation thickness between electrode plates; (*c*) minimized enclosed space within the capacitor and (*d*) image currents in very close physical proximity result in low inductance for the condenser in both embodiments of FIGURES 5 and 6. However, the structure of FIGURE 5 is preferred; it provides the lowest internal inductance.

Figure 7:
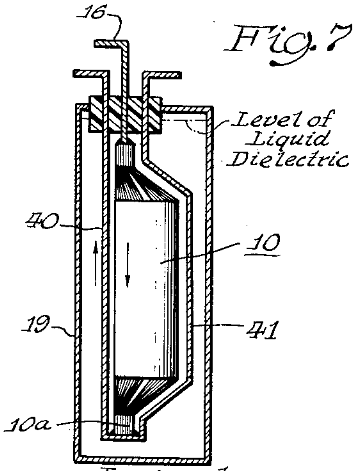
FIGURE 7 represents a single-unit condenser embodying the invention.

At the same time, it is not necessary to use one or more pairs of capacitor units to avail of the benefits of the invention. While maximum improvement requires at least two capacitor units in the condenser, very considerable improvement is possible in structures utilizing only a single capacitor unit as, for example, that shown in FIGURE 7. In this modification the capacitor unit 10 is constructed as described in connection with FIGURES 1–3 and terminal strip 16 is connected thereto. The other terminal strip is a two part structure including components 40 and 41. Terminal part 40 is a copper strip or it may be of aluminum or copper plated steel as is true of the connectors in any of the several arrangements. This strip connects to electrode plate 10*a* which, as explained above, is the outside or enveloping foil turn and consequently there is no material voltage gradient between strip part 40 and unit 10. The space separation between them may be minimized to achieve the necessary close physical proximity of image discharge currents indicated by the arrows. The strip portion 41 may be a continuation of strip 40 and for the same reason may have a very minimum separation from unit 10. Preferably, it is shaped to conform to the configuration of the envelope of the interlaced electrode structure, as shown, in order to maintain this minimum separation throughout the extent of member 41.

The concept and connotation of plate elements of the capacitor unit included in the described structures has been derived from a recognition of the fact that the winding loops 12 do indeed constitute but a small portion of the active capacitor. In fact, such loops could be eliminated or the electrode structures could be fabricated from a series of separated plate elements integrated into a multi-plate structure. As a practical matter, however, it is more expedient to adopt the age old foil winding practice of the art.

Experience with condensers described herein, particularly of the embodiment of FIGURES 1–3, shows their utility in fast circuits and their demonstrable superiority over condensers of conventional construction. They lend themselves to a variety of combinations, featuring high voltage or high capacitance and lower voltage, and contribute the desirable property of extremely low internal inductance.

While particular embodiments of the invention have been illustrated and described, numerous variations and modifications thereof may be made without departing from the true spirit and scope of the invention; accordingly, it is intended by the appended claims to cover all such variations and modifications.

I claim:

1. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material interposed between adjacent conductive elements of said interlaced structures; a pair of space-opposed terminal strips individually having a width approximately equal to that of said elements, one strip being conductively connected to said end sections of one of said electrode structures and extending in a given direction from said condenser; and means including at least one conductor having the same width as said terminal strips, connected to the other of said terminal strips as an extension thereof, coupled to the other electrode structure and extending in parallel relation to but with minimum separation from said interlaced structure to present with said one strip a condition of image currents in close physical proximity.

2. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material having a minimum thickness in relation to the voltage rating of the condenser interposed between adjacent conductive elements of said interlaced structures; a pair of space-opposed terminal strips individually having a width approximately equal to that of said elements, one strip being conductively connected to said end sections of one of said electrode structures and extending in a given direction from said condenser; and means including at least one conductor having the same width as said terminal strips, connected to the other of said terminal strips as an extension thereof, coupled to the other electrode structure and extending in parallel relation to but with minimum separation from said interlaced structure to present with said one strip a condition of image currents in close physical proximity.

3. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material having a minimum thickness in relation to the voltage rating of the condenser interposed between adjacent conductive elements of said interlaced structures; a pair of space-opposed terminal strips individually having a width approximately equal to that of said elements, one strip being conductively connected along its entire width to said end sections of one of said electrode structures and extending in a given direction from said condenser; and means including at least one conductor having the same width as said terminal strips, connected to the other of said terminal strips as an extension thereof, coupled to the other electrode structure and extending in parallel relation to but with minimum separation from said interlaced structure to present with said one strip a condition of image currents in close physical proximity.

4. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in such interlaced fashion with said first structure that the two outermost elements of the interlaced structure are of said first plurality while the two innermost elements thereof are of said second plurality; insulating material interposed between adjacent conductive elements of said interlaced structures; a pair of space-opposed terminal strips individually having a width approximately equal to that of said elements, one strip being conductively connected to said end sections of one of said electrode structures; and means including at least one conductor having the same width as said terminal strips, connected to the other of said terminal strips as an extension thereof, coupled to the other electrode structure and extending in parallel relation to but with minimum separation from said interlaced structure to present with said one strip a condition of image currents in close physical proximity.

5. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material interposed between adjacent conductive elements of said interlaced structures to complete a first capacitor unit of a predetermined capacitance; a second capacitor unit of the same construction as said first unit disposed in parallel relation to said first unit and having a minimum separation therefrom; a pair of terminal strips individually having a width approximately equal to that of said elements, conductively connected to corresponding ones of said end sections of said first and second units and extending in parallel relation and in the same direction from said units with a minimum separation therebetween; and a further connector strip of said width conductively connected to the remaining ones of said end sections of said units to complete a series circuit from one of said pair of strips, through one of said units, said further strip, the other of said units and the other of said pair of strips.

6. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material interposed between adjacent conductive elements of said interlaced structures to complete a first capacitor unit of a predetermined capacitance; a second capacitor unit of the same construction as said first unit disposed in parallel relation to said first unit and having a minimum separation therefrom; a pair of terminal strips individually having a width approximately equal to that of said elements, conductively connected to corresponding ones of said end sections of said first and second units and extending in parallel relation and in the same direction from said units; and a further connector strip of said width conductively connected to the remaining ones of said end sections of said units to complete a series circuit from one of said pair of strips, through one of said units, said further strip, the other of said units and the other of said pair of strips.

7. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in such interlaced fashion with said first structure that the two outermost elements of the interlaced structure are of said first plurality while the two innermost elements thereof are of said second plurality; insulating material interposed between adjacent conductive elements of said interlaced structures to complete a first capacitor unit of a predetermined capacitance; a second capacitor unit of the same construction as said first unit disposed in parallel relation to said first unit and having a minimum separation therefrom; a pair of terminal strips individually having a width approximately equal to that of said elements, conductively connected to said innermost elements of both said capacitor units and extending in parallel relation and in the same direction from said units with a minimum separation therebetween; and a further connector strip of said width conductively connected to said outermost elements of both said capacitor units to complete a series circuit from one of said pair of strips, through one of said units, said further strip, the other of said units and the other of said pair of strips.

8. A low-inductance condenser comprising: a first plurality of essentially planar conductive elements of approximately equal width arranged in juxtaposed parallel relation with corresponding end sections of each pressed together in a stack to effect conductive connections therebetween and to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material interposed between adjacent conductive elements of said interlaced structures; a pair of space-opposed terminal strips individually having a width approximately equal to that of said elements, one strip being conductively connected to said end sections of one of said electrode structures and extending in a given direction from said condenser; and means including at least one conductor having the same width as said terminal strips, connected to the other of said terminal strips as an extension thereof, coupled to the other electrode structure and extending in parallel relation to but with minimum separation from said interlaced structure to present with said one strip a condition of image currents in close physical proximity.

9. A low-inductance condenser comprising: a first plurality of essentially planar conductive elements of approximately equal width arranged in juxtaposed parallel relation with corresponding end sections of each pressed against an end of one of said elements to effect conductive connections therebetween and to constitute an electrode structure having a thickness small with respect to said width; a second and like plurality of planar conductive elements of substantially the same dimensions as, and disposed and connected to one another in the same manner as said first elements to constitute a second electrode structure disposed in such interlaced fashion with said first structure that the two outermost elements of the interlaced structure are of said first plurality while the two innermost elements thereof are of said second plurality; insulating material interposed between adjacent conductive elements of said interlaced structure to complete a first capacitor unit of a predetermined capacitance; a second capacitor unit of the same construction as said first unit disposed in parallel, mirror-image relation to and with minimum separation from said unit; a pair of terminal strips individually having a width approximately equal to that of said elements, conductively connected to said innermost elements of both said capacitor units and extending in parallel relation and in the same direction from said units; and a further connector strip of said width conductively connected to said outermost elements of both said capacitor units to complete a series circuit from one of said pair of strips, through one of said units, said further strip, the other of said units and the other of said pair of strips.

10. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as, and disposed and connected to one another in the same manner as, said first elements to constitute a second electrode structure disposed in interlaced relation with said first structure; insulating material interposed between adjacent conductive elements of said interlaced structures to complete a first capacitor unit of a predetermined capacitance; a second capacitor unit of the same constructions as said first unit disposed in parallel relation to said first unit and having a minimum separation therefrom; a pair of terminal strips individually having a width approximately equal to that of said elements, conductively connected to corresponding ones of said end sections of said first and second units and extending in parallel relation and in the same direction from said units with a minimum separation therebetween; and a further connector strip of said width conductively connected to the remaining ones of said end sections of said units to complete a series circuit from one of said pair of strips, through one of said units, said further strip, the other of said units and the other of said pair of strips; a container enclosing said capacitor units; a feed-through insulator positioned in an end wall of said container and having a pair of parallel slots through which said pair of terminal strips project; and a partition member extending between said slots to define with said terminal strips a pair of recesses for receiving insulation.

11. A low-inductance condenser comprising: a first plurality of essentially planar conductive elements of approximately equal width arranged in juxtaposed parallel relation and conductively connected together along corresponding end sections of each to constitute an electrode structure having a thickness small with respect to said width; a second and like plurality of planar conductive elements of substantially the same dimensions as and disposed and connected to one another in the same manner as said first elements to constitute a second electrode structure disposed in interlaced relation with said first structure; insulating material interposed between adjacent conductive elements of said interlaced structures to complete a first capacitor unit of a predetermined capacitance; an odd number of additional capacitor units constructed as said first unit and arranged therewith to form two vertical stacks with an equal number of said units in each and with a minimum separation between said stacks; a pair of terminal strips individually having a width approximately equal to that of said elements, conductively connected to corresponding ones of said end sections of the terminal units of each said stack and extending in parallel relation and in the same direction from said stacks; and further connector strips of said width connected to the remaining end sections of units to complete a series circuit between said units.

References Cited in the file of this patent

UNITED STATES PATENTS

| | | |
|---|---|---|
| 1,474,486 | MacPherson | Nov. 20, 1923 |
| 1,555,251 | Priess | Sept. 29, 1925 |
| 1,555,252 | Priess | Sept. 29, 1925 |
| 1,824,530 | Bailey | Sept. 22, 1931 |
| 2,004,616 | Park | June 11, 1935 |